United States Patent [19]
Kahle et al.

[11] Patent Number: 5,732,235
[45] Date of Patent: Mar. 24, 1998

[54] METHOD AND SYSTEM FOR MINIMIZING THE NUMBER OF CYCLES REQUIRED TO EXECUTE SEMANTIC ROUTINES

[75] Inventors: James Allan Kahle; Soummya Mallick; Larry Bryce Phillips; Russell Adley Reininger, all of Austin, Tex.

[73] Assignee: International Business Machines Corporation, Armonk, N.Y.

[21] Appl. No.: 591,291

[22] Filed: Jan. 25, 1996

[51] Int. Cl.[6] .................................................. G06F 9/30
[52] U.S. Cl. .............................. 395/385; 395/384
[58] Field of Search .................................. 395/384, 385

[56] References Cited

U.S. PATENT DOCUMENTS

| | | |
|---|---|---|
| 4,984,154 | 1/1991 | Hanatani et al. |
| 5,021,945 | 6/1991 | Morrison et al. |
| 5,136,697 | 8/1992 | Johnson . |
| 5,283,873 | 2/1994 | Steely, Jr. et al. |
| 5,333,280 | 7/1994 | Ishikawa et al. |
| 5,333,283 | 7/1994 | Emma et al. |
| 5,367,703 | 11/1994 | Levitan . |
| 5,381,532 | 1/1995 | Suzuki . |
| 5,381,533 | 1/1995 | Peleg et al. |

FOREIGN PATENT DOCUMENTS 3171327  7/1991  Japan .

OTHER PUBLICATIONS

IBM Technical Disclosure Bulletin, vol. 33 No. 11, Apr. 1991; pp. 66–69.

*Primary Examiner*—Krisna Lim
*Attorney, Agent, or Firm*—Sawyer & Associates; Mark E. McBurney

[57] ABSTRACT

A system and method for reducing the cycle time necessary to execute semantic routines in a processor that emulates guest instructions. Each of the semantic routines includes a block of host instructions for performing the function of the corresponding guest instruction, and the last instruction in each of the semantic routines is a branch instruction. The method and system first determines the block length of each of the semantic routines. When a first guest instruction is encountered, the block of instructions in a first semantic routine corresponding to a guest instruction is executed. The block length of first semantic routine is then used to determine when to fetch a second semantic routine without fetching and decoding the branch instruction in the first semantic routine, thereby increasing emulation performance.

11 Claims, 6 Drawing Sheets

METHOD AND SYSTEM FOR MINIMIZING THE NUMBER OF CYCLES REQUIRED TO EXECUTE SEMANTIC ROUTINES

FIELD OF THE INVENTION

The present invention relates to a method and system for emulating guest instructions in a host processor, and more particularly to a method and system for minimizing the number of cycles required to execute semantic routines that emulate the guest instructions.

BACKGROUND OF THE INVENTION

There are two methods for emulating in software a guest instruction set, such as the Intel x86 instruction set, on a host processor, such as the Motorola PowerPC™. The first method is known as interpretation, which uses an interpreter, and the second as dynamic translation, which uses a dynamic translator. Interpreters mimic the fetch, decode, and execute cycles performed by hardware in traditional host processors. Dynamic translators fetch and decode a block of guest instructions and translate them into host instructions, which are then reused. Each method has strengths and weaknesses.

Interpreters typically use less memory, but perform slower than dynamic translators. Dynamic translators perform well when the guest program include parts that are frequently reused. But dynamic translators perform poorly when the guest program modifies parts that had previously been translated.

The assignee of the present application has developed hardware that assists software emulation methods in order to obtain a solution that has the positive characteristics of both methods: the small size of the interpreter and the speed of execution of the dynamic translator. Before the assisting hardware is used, the sequence of host instructions necessary to perform the function of each guest instruction are compiled into separate functions, cared semantic routines, and stored in memory. The hardware works in conjunction with software to fetch guest instructions, decode them, and dispatch the corresponding semantic routine in the host processor.

Each of the semantic routines ends with a branch instruction to signal when to dispatch the next semantic routine to be executed. However, the disadvantage of this method is that the each of the branch instructions must first be fetched and decoded before the dispatch of the next semantic routine can occur. This results in a significant processing delay due to the addition of extra processor cycles.

What is needed therefore is a system and method for reducing the cycle time necessary to execute a semantic routine. The present invention addresses such a need.

SUMMARY OF THE INVENTION

The present invention provides a method and system for reducing the cycle time necessary to execute semantic routines in a processor that emulates guest instructions. Each of the semantic routines includes a block of host instructions for performing the function of the corresponding guest instruction, and the last instruction in each of the semantic routines is a branch instruction. The method and system first determines the block length of each of the semantic routines. When a first guest instruction is encountered, the block of instructions in a first semantic routine corresponding to a guest instruction is executed. The method and system further comprises using the block length of first semantic routine to determine when to fetch a second semantic routine without fetching and decoding the branch instruction in the first semantic routine, thereby increasing emulation performance.

DESCRIPTION OF THE INVENTION

The present invention relates to an improvement in emulating guest instructions in a host processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
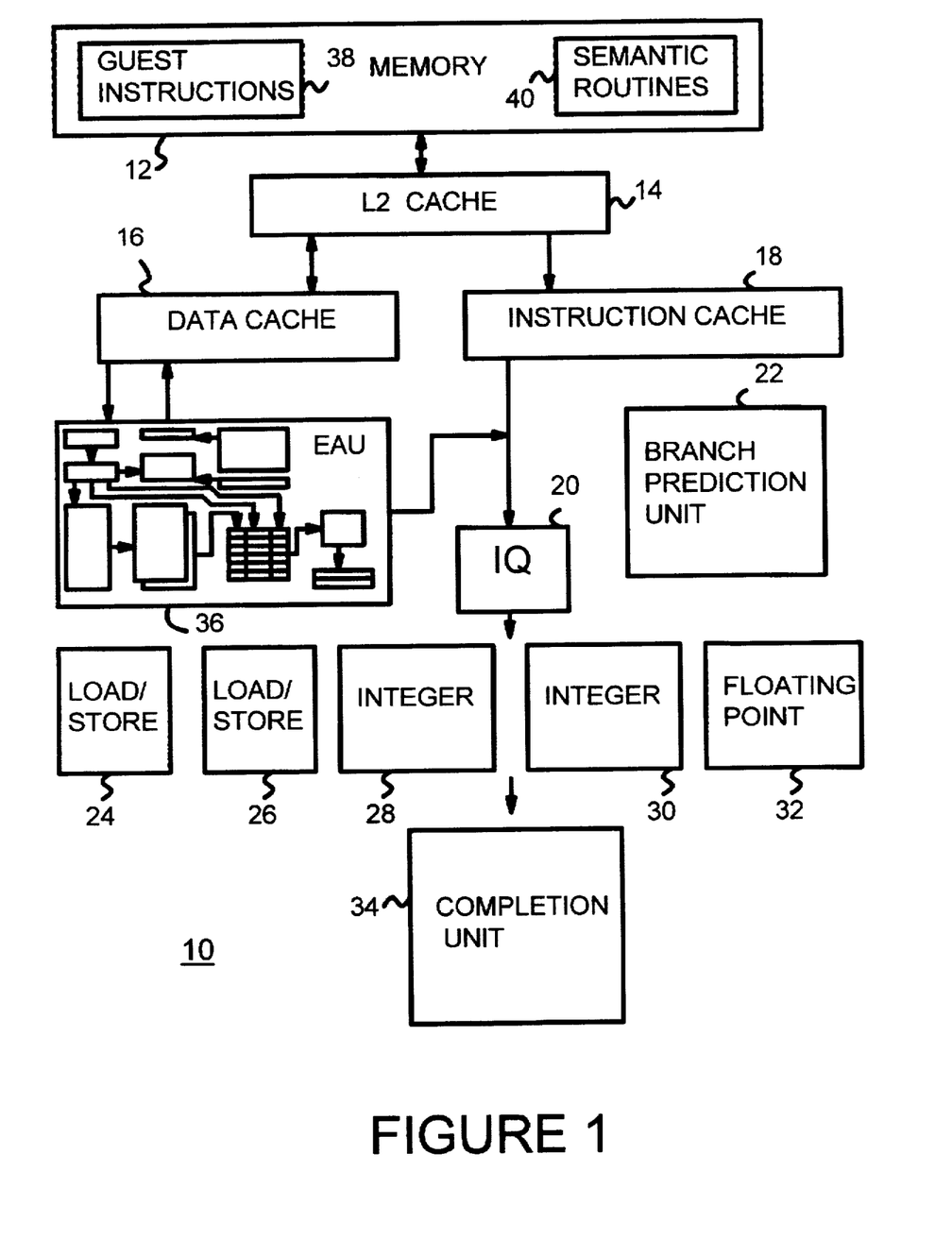
FIG. 1 is a block diagram depicting a high-level architecture of a host processor.

FIG. 1 is a block diagram depicting a high-level architecture of a host processor 10. Typically, the processor 10 executes native software instructions using various hardware components, such as a memory 12, a level 2 (L2) cache 14, a data cache 16, an instruction cache (IC) 18, an instruction queue (IQ) 20, a branch prediction unit 22, functional units 24–32, and a completion buffer 34.

In a preferred embodiment of the present invention, the processor 10 is a PowerPC™ manufactured by Motorola that executes a PowerPC™ (PPC) instruction set. Besides executing the PPC instruction set, the processor 10 is also capable of emulating a plurality of guest instructions 38, such as Intel x86 instructions and Motorola 68K Complex Instruction Set Computers (CISC) instructions.

The component responsible for assisting the processor 10 in emulating guest instructions 38 is an emulation assist unit (EAU) 36. To enable the processor 10 to emulate the guest instructions 38, each guest instruction 38 is first translated into a corresponding set of host instructions, called a semantic routine 40, that perform the function of guest instruction 38 in the host processor 10. Each semantic routine 40 is stored at a specific address location in the memory 12. The guest instructions 38 (and data) are also stored in the memory 12.

In operation, the processor 10 caches the guest instructions 38 and data into the L2 cache 14 and the data cache 16, respectively. The EAU 36 fetches and decodes the guest instructions 38, and then maps each of the guest instructions 38 into the host memory address of the corresponding semantic routine 40. The processor 10 fetches the semantic routine 40 located at the specified memory address into the instruction cache 18. The host instructions contained in the semantic routine 40 are then transferred to the IQ 20. Each host instruction is then decoded and executed using the branch prediction unit 22 and the functional units 24–32.

After the semantic routine 40 is executed and the results stored in the completion buffer 34, the EAU 36 maps the host address of the next guest instruction 38, and the process repeats.

Figure 2:
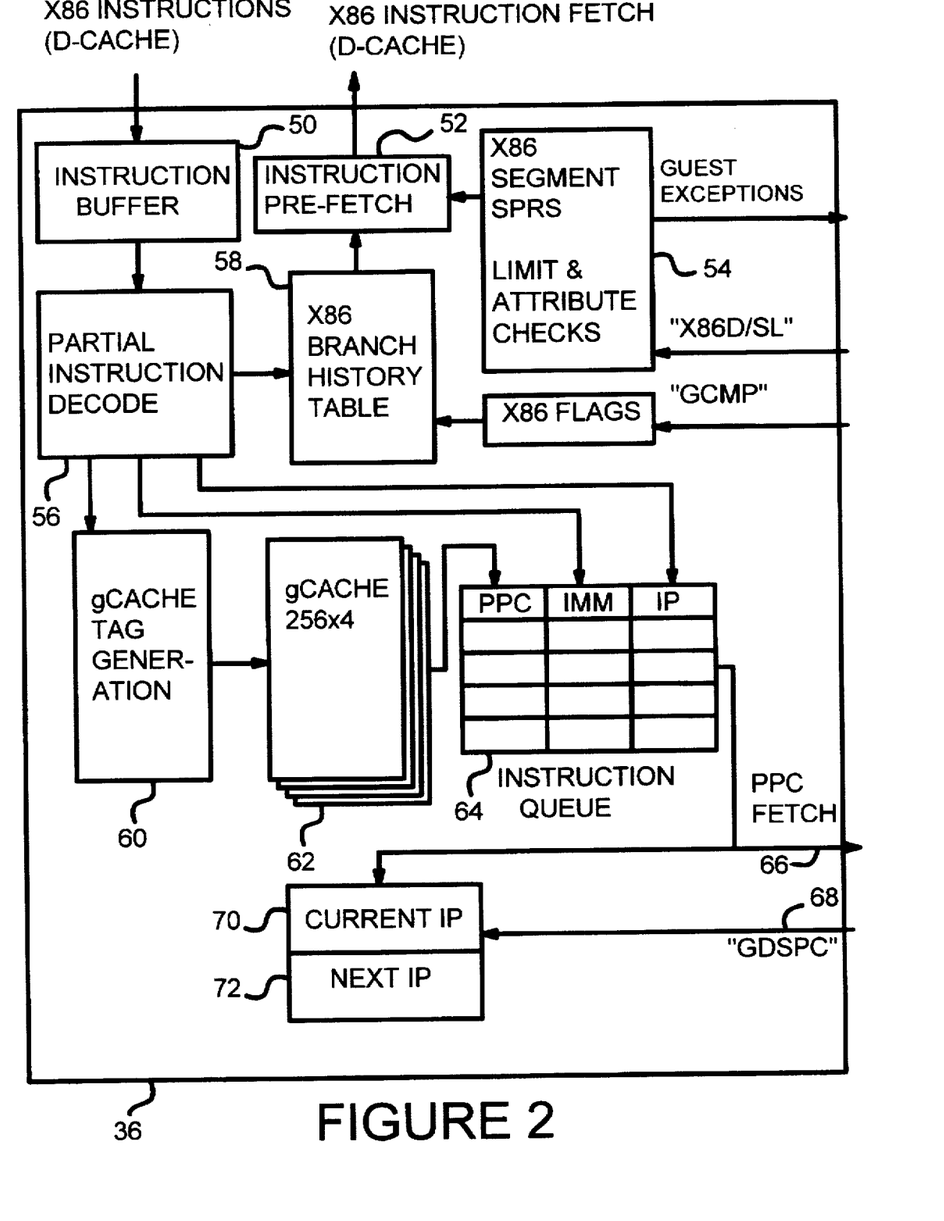
FIG. 2 is a block diagram illustrating an emulation assist unit.

Referring now to FIG. 2, a block diagram of the EAU 36 is shown. The EAU 36 includes an instruction buffer 50, a pre-fetch unit 52, special purpose registers (SPRs) 54, a decode unit 56, a branch history table 58, a tag generation unit 60, a guest cache (gcache) 62, and a gcache instruction queue 64. The function of the EAU 36 is assist the processor 10 in emulating guest instructions 38 using a direct mapping scheme.

A guest instruction 38 is first pre-fetched by the pre-fetch unit 52 from the data cache 16. The guest instruction 38 is then loaded into the instruction buffer 50 and transferred to the decode unit 56. Since a direct mapping of a guest instruction 38 to a host address is complicated by its syntax, the decode unit 56 is used to parse or decode a guest instruction 38 to determine length, branch type, and immediate data. If the instruction 38 is a branch, the branch history table 58 is used to predict the next pre-fetch address.

The gcache 62 is an array that includes an entry for each semantic routine 40 and its corresponding host memory address. After the guest instruction 38 is decoded, the tag generation unit 60 converts the instruction 38 into a unique opcode tag, and the opcode tag is used as an index to the gcache 62 to access the corresponding semantic routine 40 address.

As guest instructions 38 are decoded and the corresponding semantic routines 40 become known, the semantic routines 40 and their addresses are stored in the gcache instruction queue 64. Each entry in the instruction queue 64 contains the host address of a semantic routine 40, the immediate data that was contained in the guest instruction 38, and a guest instruction pointer.

Referring to both FIGS. 1 and 2, the processor 10 fetches the first entry in the instruction queue 64 via line 66, and retrieves the appropriate semantic routine 40 from memory 12 for execution. The last instruction in each semantic routine 40 is a branch instruction, which in a preferred embodiment, is a guest dispatch complete (gdisc) instruction 68. When the processor 10 fetches and decodes a gdisc instruction 68, it causes the processor 10 to fetch, via line 68, the address of the next semantic routine 40 from the instruction queue 64.

In a preferred embodiment, the address of the next semantic routine 40 to be executed is stored in the current instruction pointer (IP) 70. The decode of the gdisc instruction 68 also causes the next IP 72 to be moved into the current IP 72. Also in a preferred embodiment, the gdisc instruction is an unconditional branch instruction, but any instruction that causes the processor to fetch the next semantic routine may be used.

As stated above, the semantic routines 40 are stored in memory 12. In a preferred embodiment, the semantic routines are stored in a semantic buffer within the memory 12.

Figure 3:
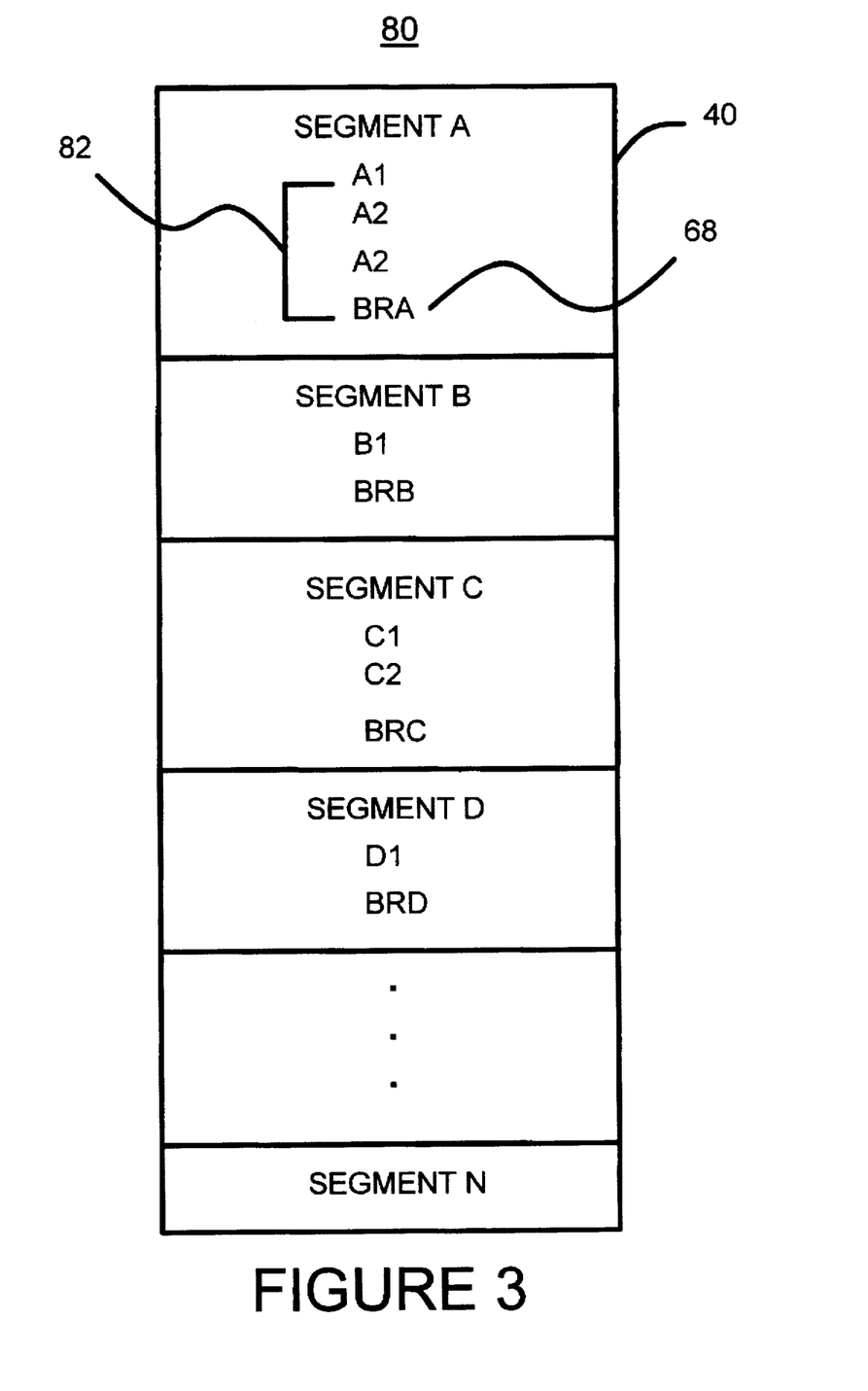
FIG. 3 is a block diagram illustrating a semantic buffer.

Referring now to FIG. 3, a block diagram of a semantic buffer 80 is shown. The semantic buffer 80 contains a plurality of semantic routines 40, shown as semantic routines A–N. Each of the semantic routines 40 include a block 82 of instructions 82. The last instruction in each of the blocks 82 is an unconditional branch instruction 68. The number of instructions in each block 82 determine the length of the block 82. For example, semantic routine A includes three instructions followed by one branch instruction 68. Therefore, semantic routine A has a block length of four.

Figure 4:
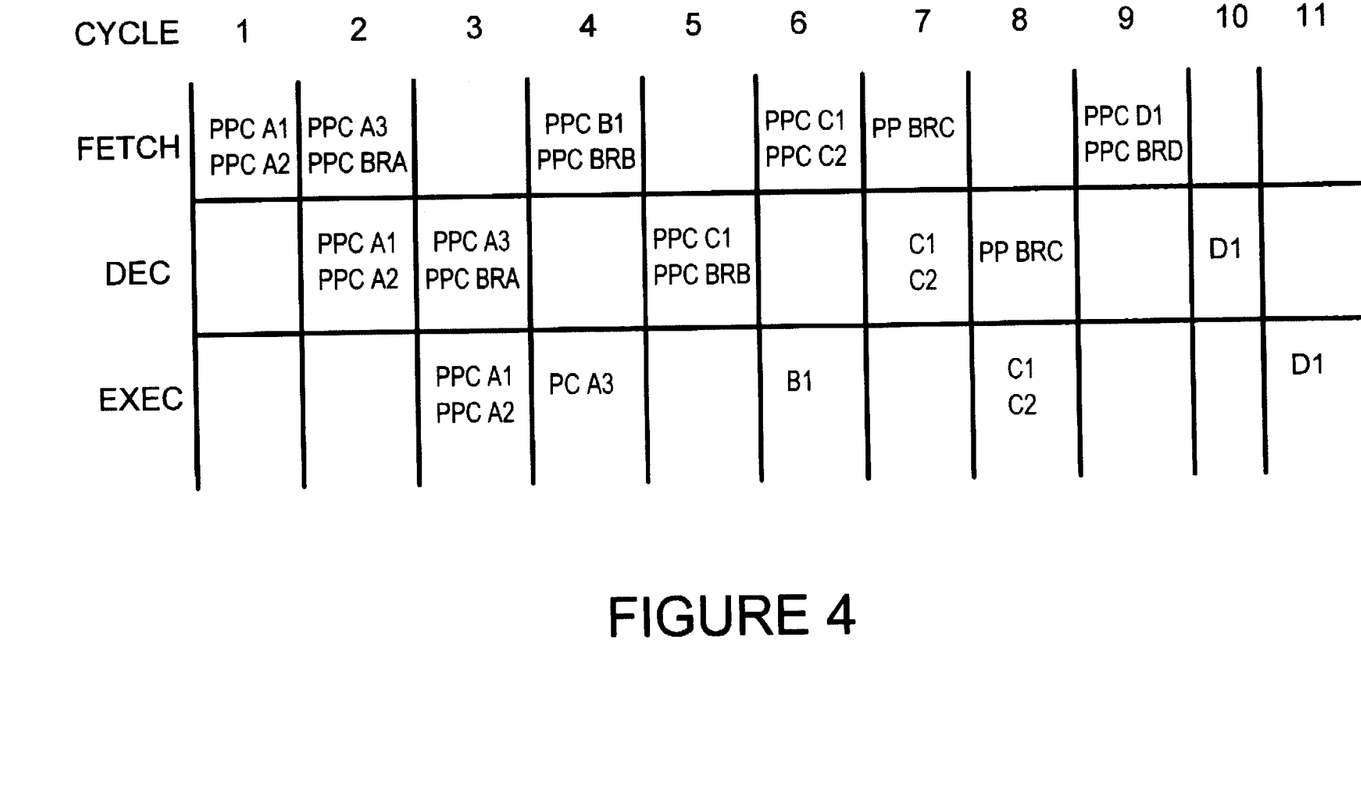
FIG. 4 is a timing diagram of the processor cycles necessary to execute four semantic routines.

Referring now to FIG. 4, a timing diagram of the processor cycles necessary to execute semantic routines A through D is shown. The processor 10 executes instructions in a pipeline process that includes a fetch cycle, decode cycle, and an execute cycle.

In a preferred embodiment, the processor 10 has a bandwidth of two, meaning that the processor 10 is capable of fetching two instructions at once during a fetch cycle.

Assume that in FIG. 4, the processor 10 is to execute semantic routines A through D in sequence. In cycle 1, instructions A1 and A2 of semantic routine A are fetched. In cycle 2, instructions A1 and A2 are decoded while instructions A3 and BRA are fetched. In cycle 3, instructions A1 and A2 are executed while instructions A3 and BRA are decoded. The next fetch address is unknown until the BRA instruction is decoded. Therefore, no instructions are fetched during this cycle.

In cycle 4, only instruction A3 is executed since BRA is only decoded, not executed, and instructions B1 and BRB are fetched. In cycle 5, instructions B1 and BRB are decoded. Since the branch address for semantic routine C is unknown at this time, instructions C1 and C2 are not fetched until cycle 6. The instructions for semantic routines C and D are fetched, decoded, and executed in a similar manner. Overall, nine execution cycles (cycles 3–11) were required to execute semantic routines A–D.

As shown in FIG. 4, a processor cycle is wasted every time the processor 10 is forced to fetch and decode a branch instruction 68 to determine when to fetch the next semantic routine 40. The addition of these extra cycles results in a performance penalty.

The present invention is a method and system for minimizing the number of cycles required to execute semantic routines. According to the present invention, the block lengths of each of the semantic routines is utilized to determine when to fetch the next semantic routine, which eliminates the need to fetch and decode the gdisc branch instructions 68 and saves processor cycles. To more particularly illustrate the present invention, refer now to FIG. 5.

Figure 5:
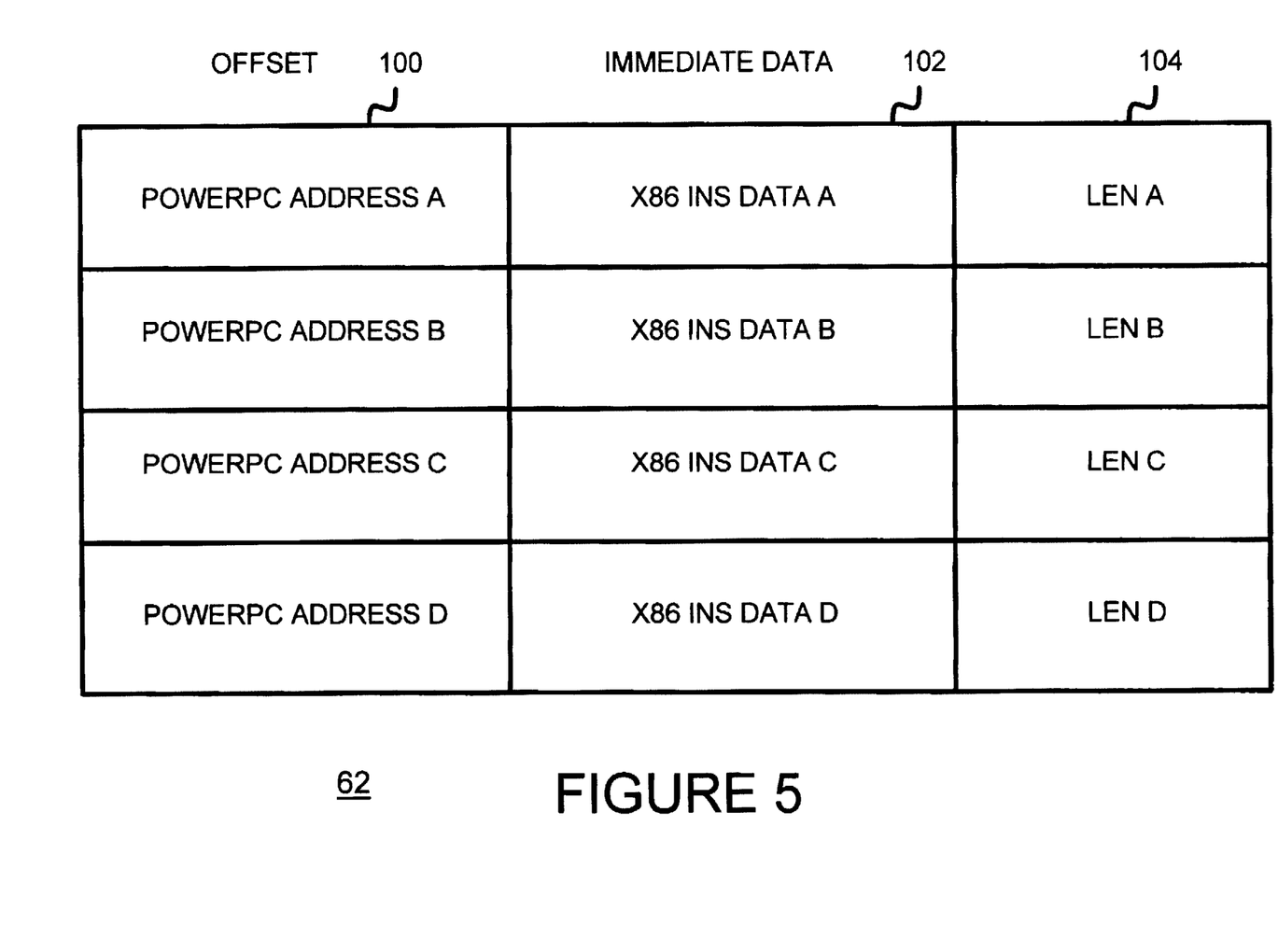
FIG. 5 is a block diagram depicting a guest cache.

FIG. 5 is a block diagram of a gcache 62. Each entry in the gcache instruction queue (IQ) 64 typically comprises an offset field 100 and a data field 102. The offset field 100 is a pointer to the host (PowerPC (PPC)) address of the semantic routines 40. The data field 100 includes the immediate data from the guest instruction 38 that the semantic routine 40 is to process.

According to the present invention, each entry in the gcache IQ 64 is provided with a length field 104 that contains the block length of the corresponding semantic routine 40. In a preferred embodiment, the block length is determined when a semantic routine 40 is compiled.

Referring to both FIGS. 2 and 5, when the processor 10 reads an entry from the gcache IQ 64, the value in length field 104 is stored within a counter in the processor 10, and is used to indicate how many instructions will occur before a gdisc branch instruction 68 is encountered. As each instruction in the semantic routine is fetched, the counter containing the value in the length field 104 is decremented. A value of "1" indicates that the next instruction in the semantic routine is a gdisc branch instruction 68. At this point, the processor 10 uses the current instruction pointer 70 to fetch the target address of the next semantic routine 40 without having to fetch and decode the branch instruction 68.

The fetch bandwidth of the processor may cause a branch instructions 68 to be fetched even though the value of in counter indicates otherwise. A branch instruction will be fetched even though the counter is less than or equal to one when the block length of the semantic routine divided by the fetch bandwidth results in an even value. For example, referring again to FIG. 3, semantic routine A includes four instruction. Assuming that the fetch bandwidth is two, then the block length (four) divided by the fetch bandwidth (2) is two, an even number, and the BRA instruction will be fetched. This principle is illustrated in the following example.

Figure 6:
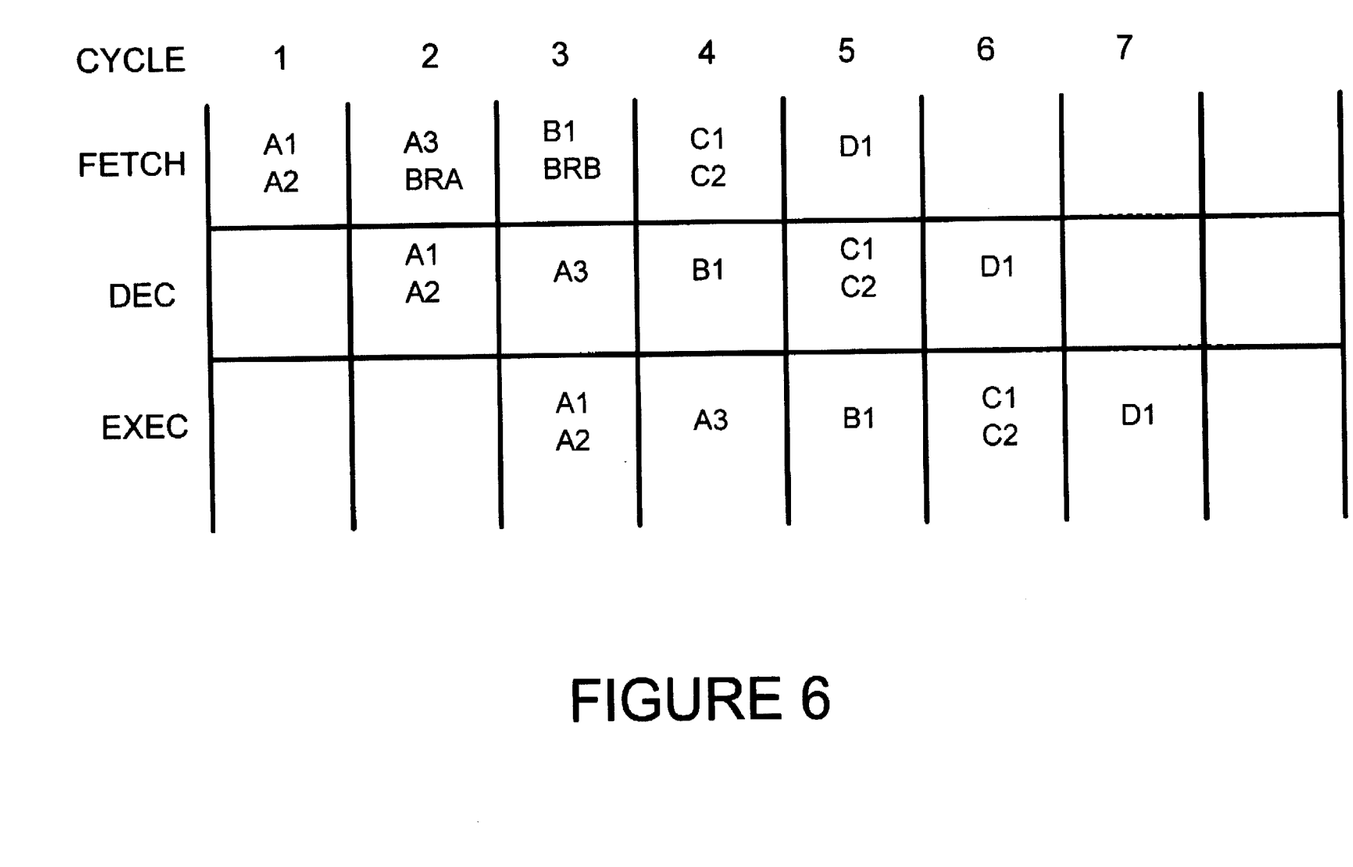
FIG. 6 is a timing diagram of the processor cycles necessary to execute four semantic routines when the block length is utilized in accordance with the present invention.

FIG. 6 is a timing diagram of the processor cycles necessary to execute semantic routines A through D when the block length is utilized in accordance with the present invention. In cycle 1, instructions A1 and A2 of semantic routine A are fetched. At this point, the value of the length field 104 (not shown) is decremented from four to two.

In cycle 2, instructions A1 and A2 are decoded while instructions A3 and BRA are fetched. Since the processor fetches two instructions at once, BRA was also fetched, and the value of length is decremented from two to zero. If the processor 10 only fetched one instruction at a lime then the fetch of BRA would not occur.

In cycle 3, instructions A1 and A2 are executed, and instruction A3 is decoded. Since the value of length is less than one, the BRA instruction is not decoded, and the processor 10 fetches instructions B1 and BRB in the same cycle. Using the length of semantic routine A, the processor 10 was not required to wait until the next cycle to determine the address of semantic routine B, thus saving a processor cycle.

In cycle 4, only instruction A3 is executed, and instruction B1 is decoded. Since the length field for semantic routine B was decremented from 2 to zero and is now is less than one, the BRB instruction is not decoded, and the processor 10 fetches instructions C1 and C2 in the same cycle. The instructions for semantic routines C and D are fetched, decoded, and executed in a similar manner. It can be seen from FIGS. 4 and 6 that the execution time for semantic routines A–D has been reduced from nine to five cycles (cycles 3–7) when using the block length in accordance with the present invention.

As stated above, the counter containing the value of the length field 104 can be decremented to zero when the processor fetches two instructions at once. A zero value in the counter can also occur in other ways. In a preferred embodiment of the present invention, the counter used to store the value of the length field is non-architected. Therefore, when an interrupt occurs within the processor 10, the value of the length field will be destroyed. After an interrupt, the counter is restored to zero. A zero value will also occur when the length of a semantic routine could not be determined because the routine included a conditional branch instruction. In any of the above cases, when the value of length in the counter is zero, the processor fetches the next instruction in the semantic routine 40.

In an alternative embodiment, the gdisc branch instruction is removed from the semantic routines 40 to save memory. In this embodiment, however, the value of the counter needs to be saved, or the number of instructions left to execute in the semantic routine must be calculated, when an interrupt occurs.

A method and system has been disclosed that minimizes the number of cycles required to execute semantic routines through the use of block lengths, thereby increasing emulation performance. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reducing the cycle time necessary to execute semantic routines in a processor that emulates guest instructions, each of the semantic routines including a block of host instructions, wherein the last instruction in each of the semantic routines is a branch instruction, the method comprising the steps of:

(a) determining a block length for each of the semantic routines;

(b) executing the block of instructions in a first semantic routine corresponding to a first guest instruction; and (c) using the block length of the first semantic routine to determine when to fetch a second semantic routine without fetching and decoding the branch instruction in the first semantic routine, thereby increasing emulation performance.

2. A method as in claim 1 wherein step (a) further includes the step of:

(a1) storing the block length in a counter.

3. A method as in claim 2 wherein step (b) further includes the step of:

(b1) decrementing the counter when each of the instructions in the semantic routine is executed.

4. A method as in claim 3 wherein step (c) further includes the step of:

(c1) fetching the first instruction of the second semantic routine when the counter is less than or equal to one.

5. A method for reducing the cycle time necessary to execute semantic routines in a processor that emulates guest instructions, each of the semantic routines including a block of host instructions, wherein the last instruction in each of the semantic routines is a branch instruction, the method comprising the steps of:

(a) determining a block length of a first semantic routine;

(b) executing the block of instructions in the first semantic routine by performing a fetch, decode, and execute cycle on each of the instructions in the block of instructions;

(c) decrementing the block length when each of the instructions in the first semantic routine is fetched; and (d) using the block length of first semantic routine to determine when to fetch a second semantic routine without fetching and decoding the branch instruction in the first semantic routine, thereby increasing emulation performance.

6. A method as in claim 5 wherein step (a) further includes the step of:

(a1) storing the block length in a counter.

7. A method as in claim 6 wherein step (c) further includes the step of:

(c1) decrementing the counter when each of the instructions in the semantic routine is executed.

8. A method as in claim 7 wherein step (c) further includes the step of:

(c1) fetching the first instruction of the second semantic routine when the counter is less than or equal to one.

9. An emulation assist unit for assisting a host processor to emulate a set of guest instructions using semantic routines, each of the semantic routines being stored at specific addresses in memory and including a block of instructions wherein the last instruction in the block is a branch instruction, each of the semantic routines further having a block length, the emulation assist unit comprising:

- a cache for associating each of the semantic routines with a memory address;
- decode means for parsing each of the guest instructions to determine instruction type;
- tag generation means for generating a tag from the instruction type in order to index the cache;
- a queue for storing entries from the cache indexed by the tag, each of the entries in the queue include an offset field, a data field, and a length field, wherein the offset field is a pointer to the memory address of one of the semantic routines, and the length field contains the block length of the corresponding semantic routine; and the processor including means responsive to a first entry in the queue for executing a first semantic routine located at the memory address indicated by the offset field, and means for using the block length to determine when to execute a second semantic routine from a second entry in the queue without fetching and decoding the branch instruction of the first semantic routine, thereby saving processor cycles.

10. An emulation assist unit as in claim 9 wherein the data field includes immediate data from the corresponding guest instruction.

11. An emulation assist unit as in claim 10 wherein the semantic routines are stored sequentially in a semantic buffer.

* * * * *